2,834,990
INJECTION MOLD FOR MOLDING CLIPS

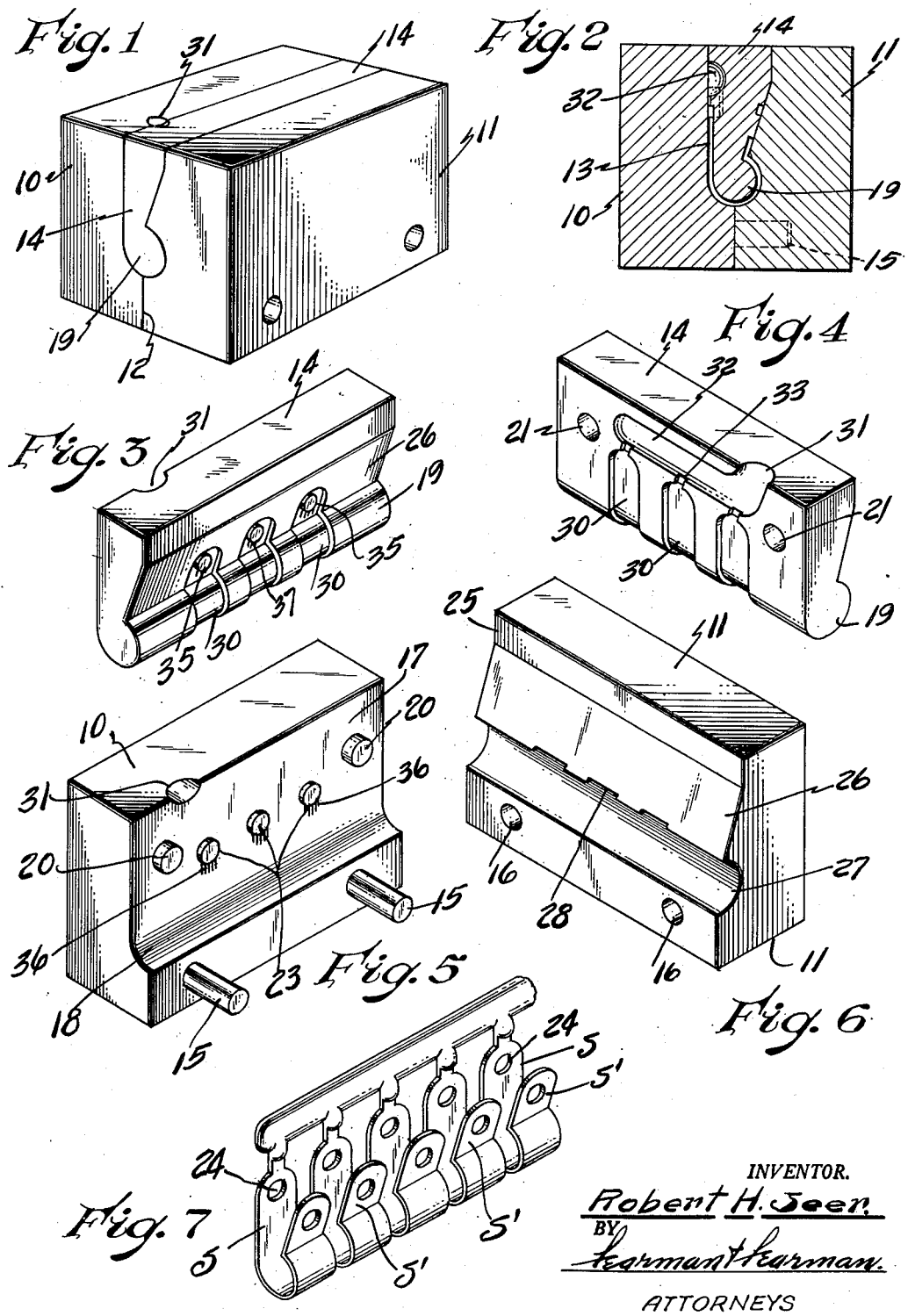

Robert H. Seer, Midland, Mich.

Application May 24, 1955, Serial No. 510,672

2 Claims. (Cl. 18—42)

This invention relates to plastic injection molds for molding support clamps and the like.

One of the prime objects of the invention is to design a high production injection mold of simple, practical and inexpensive design which can be readily manufactured, which has low maintenance cost, and is also easy and quick to assemble and disassemble.

A further object is to design a gang injection mold for molding separable support clamps which can be made up in any desired length to suit production requirements.

Another object is to design an injection mold from which the molded product can be readily removed and which will be free of sharp edges and corners which might unduly wear the cord of other material supported thereby.

A further object is to provide means in the mold for forming roughened areas on the support for holding the free end in alignment to facilitate insertion of bolts or other connecting means.

With the above and other objects in view the present invention consists in the combination and arrangement of parts hereinafter more fully described, illustrated in the accompanying drawings and more particularly pointed out in the appended claims, it being understood that changes may be made in the form, size, proportion and minor details of construction without departing from the spirit or sacrificing any of the advantages of the invention.

In the drawings:

Fig. 1 is an isometric view showing the mold assembled.

Fig. 2 is a transverse sectional view of the assembled mold.

Fig. 3 is an isometric view of the core insert.

Fig. 4 is a perspective view showing the opposite side of the core insert.

Fig. 5 is a perspective view of one of the cavity block sections.

Fig. 6 is a perspective view of the companion cavity block section.

Fig. 7 is a perspective view showing a gang of the molded supports.

Referring now more particularly to the drawings in which I have shown the preferred embodiment of my invention, the numerals 10 and 11, the cavity block sections split on the line 12, and formed with an open cavity 13 adapted to accommodate the core insert 14, the block sections being secured in accurate assembled relation by means of guide pins 15 set in the block section 10 and accommodated in registering openings 16 provided in the block 11. These individual block sections are secured to the opposed jaws of a conventional molding machine (not shown) in the usual manner. The block section 10 is shouldered or recessed as at 17, the lower end of said recessed section being curved as 18 to snugly accommodate the cylindrical shaped lower end 19 of the insert core 14.

Guide pins 20 are provided in the face of the recessed face 17 and register with openings 21 formed in the face 22 of the core 14 and a plurality of pads 23 are provided on the face 17, in spaced relation, and bear against the face 22 of the core insert, these pads forming the openings 24 in the support S, and in a manner to be presently described.

The inner face of the opposite section 11 is also recessed as at 25, thence merging into an inclined section 26 which in turn terminates in a semi-circular groove 27, and cut-outs 28 are provided in the lower lip of the surface 26 as shown.

The core insert 14 is interposed between the sections 10 and 11 and the side walls of said core are shaped to lie in facial contact with the faces 17, 18, 26 and 27 of the cavity blocks above described with the exception of the recessed portions 30 shown in Figs. 3 and 4. A sprue opening 31 leads into the upper end of the core 14 and into a horizontally disposed passage 32 provided therein and gates 33 open into the recessed passages 30, said passages lead around the cylindrical section 19, thence extending upwardly a predetermined distance and having a raised pad section 35 disposed therein, these recessed portions being the shape and depth of the support S which is molded therein.

When the mold is assembled and in closed position as indicated in Fig. 1 of the drawing, the plastic material (not shown), in liquid form, enters the mold through sprue opening 31, thence flowing in horizontal passage 32, thence through gates 33 into the cored passages 30 of the core. These cored sections are the exact shape of the supports and when the mold is filled the pads 23 and 35 form openings in said supports.

Roughened areas 36 and 37 are provided in the recessed areas 30 as shown, and these areas serve to form interlocking ribs or projections, which when forced into facial contact prevent lateral slippage of the up-turned leg S' of the support on the main body S so that the bolt holes in the support can be held in alignment and small bolts and other fastening means (not shown), readily inserted.

When the mold is placed in the machine (not shown), one cavity block is secured to one jaw, and the opposite cavity block to the opposite jaw with the core suspended therebetween. In operation these jaws move toward and away from each other. When in closed position, as shown in Fig. 1, the liquid plastic enters the mold, fills passages 29 as above described, and after cooling, the cavity blocks move away from the core. The supports S are then stripped from the core, after which the mold parts again swing back together preparatory to molding another strip of supports.

While a specific embodiment of the invention has been utilized for illustrative purposes, it will be understood that variations therefrom may be made within the terms of the hereinafter appended claims except as said claims by their own terms expressly require otherwise.

What I claim is:

1. A plastic injection mold of the class described comprising a pair of companion cavity blocks releasably secured together and forming a cavity therebetween, a core having a size and shape corresponding to the size and shape of said cavity interposed between said cavity blocks and occupying said cavity, said core having therein a recessed area of the shape and size of an article to be molded, a material opening in said core, a horizontally disposed passage communicating therewith, and a gate connecting said passage and said recessed area, said core and one of said cavity blocks having projecting pads thereon and said core and said one cavity block having roughened areas adjacent to said pads to form interlocking surfaces on opposite faces of the molded article.

2. A plastic injection gang mold of the character described comprising, a pair of companion cavity blocks releasably secured together and forming a cavity therebetween, a core insert having a size and shape corresponding to the size and shape of said cavity interposed between said blocks and occupying said cavity, said core insert being formed with a plurality of recessed areas each of a size and shape of the articles to be molded, said core insert having a cylindrical section formed at the lower end of the latter and having an inclined wall leading upwardly from said cylindrical end section, means for feeding plastic material to said recessed areas, and guide pins below said core insert for slidably securing said cavity blocks in aligned relation.

References Cited in the file of this patent

UNITED STATES PATENTS 2,499,565     Booth  ---------------- Mar. 7, 1950